Figure 1:
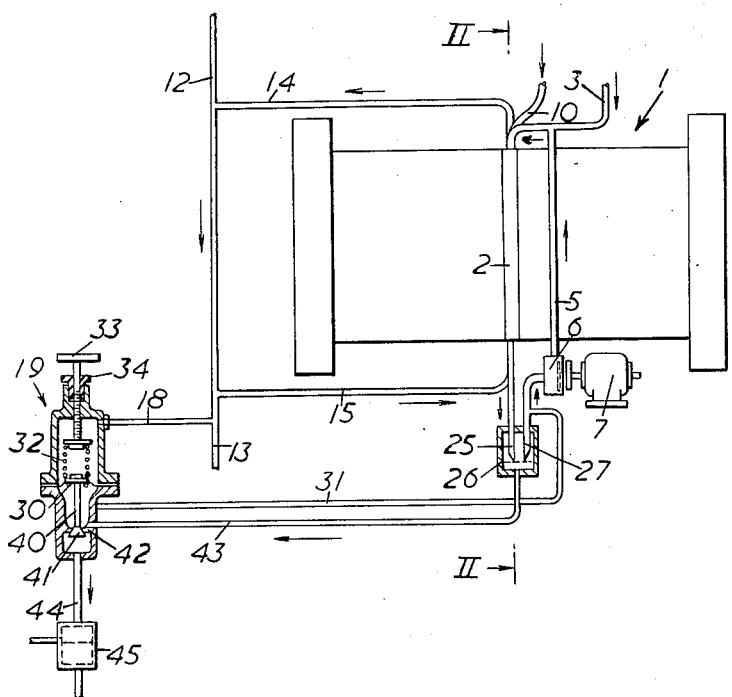

Sept. 26, 1961  F. T. BACON  3,002,039
ELECTRICAL BATTERIES

Filed April 7, 1960  2 Sheets-Sheet 1

Inventor
Francis Thomas Bacon
By Kemon, Palmer & Stewart
Attorneys 3,002,039
ELECTRICAL BATTERIES
Francis Thomas Bacon, Westfield, Little Shelford, England, assignor to National Research Development Corporation, London, England
Filed Apr. 7, 1960, Ser. No. 20,691
12 Claims. (Cl. 136—86)

This application is a continuation-in-part application to my application, Serial No. 731,263, filed on April 28, 1958, now abandoned, and is concerned with fuel cells of the hydrogen oxygen type and with batteries including such cells.

During the operation of such a battery the hydrogen and oxygen consumed are converted into water which tends to accumulate in the vicinity of the hydrogen electrodes. The reason for this is that oxygen molecules adsorbed on the surface of the positive electrode each combine with the water present to form two hydroxyl ions each carrying a single negative charge. These migrate towards the negative electrode carrying the current through the cell and combining with the hydrogen adsorbed at the negative electrode to form water. Consequently there is a slow overall increase in the total volume of the electrolyte and in addition the electrolyte tends to be diluted in the region of the hydrogen electrodes and to become more concentrated in the region of the oxygen electrode leading to polarisation of the electrodes owing to the local changes in the electrolyte concentration.

When using porous electrodes, for example as described in my U.S. Patent No. 2,716,670, that is to say nickel electrodes having a relatively coarse pore layer on the gas side and a relatively fine layer on the electrolyte side, it is necessary to maintain a small differential pressure between the gas and the electrolyte. This prevents the electrolyte flowing into the gas space, the converse being prevented by the balance established between the excess gas pressure and the surface tension in the fine pores.

The increase in the total volume of electrolyte tends to force the liquid into the coarse pores of the electrodes which become gradually flooded with liquid. This expels some of the gas, upsetting the pressure balance and detracting from the efficiency of the operation of the cell.

It is an object of the invention to remove water from the cell as it is formed by the combination of hydrogen and oxygen and thus to avoid the effect just described. It is a further object of the invention to provide a circulation system for the hydrogen of the cell whereby to remove water vapour from the vicinity of the hydrogen electrodes and to condense this vapour at a point outside the cell. Yet another object is to control the rate of condensation of water vapour in accordance with variations in the differential pressure between the hydrogen and the electrolyte and thereby to regulate the amount of water withdrawn from the cell in accordance with the amount of water formed.

In this invention the variations in the differential pressure are used either to start the circulation of hydrogen by releasing from the condenser condensate which would otherwise obstruct the flow of hydrogen or to control the operation of a hydrogen pump connected in the circulating system.

Figure 2:
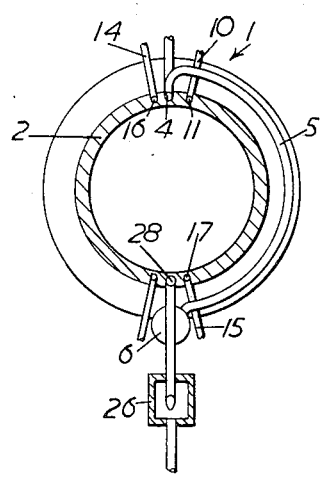
Figure 3:
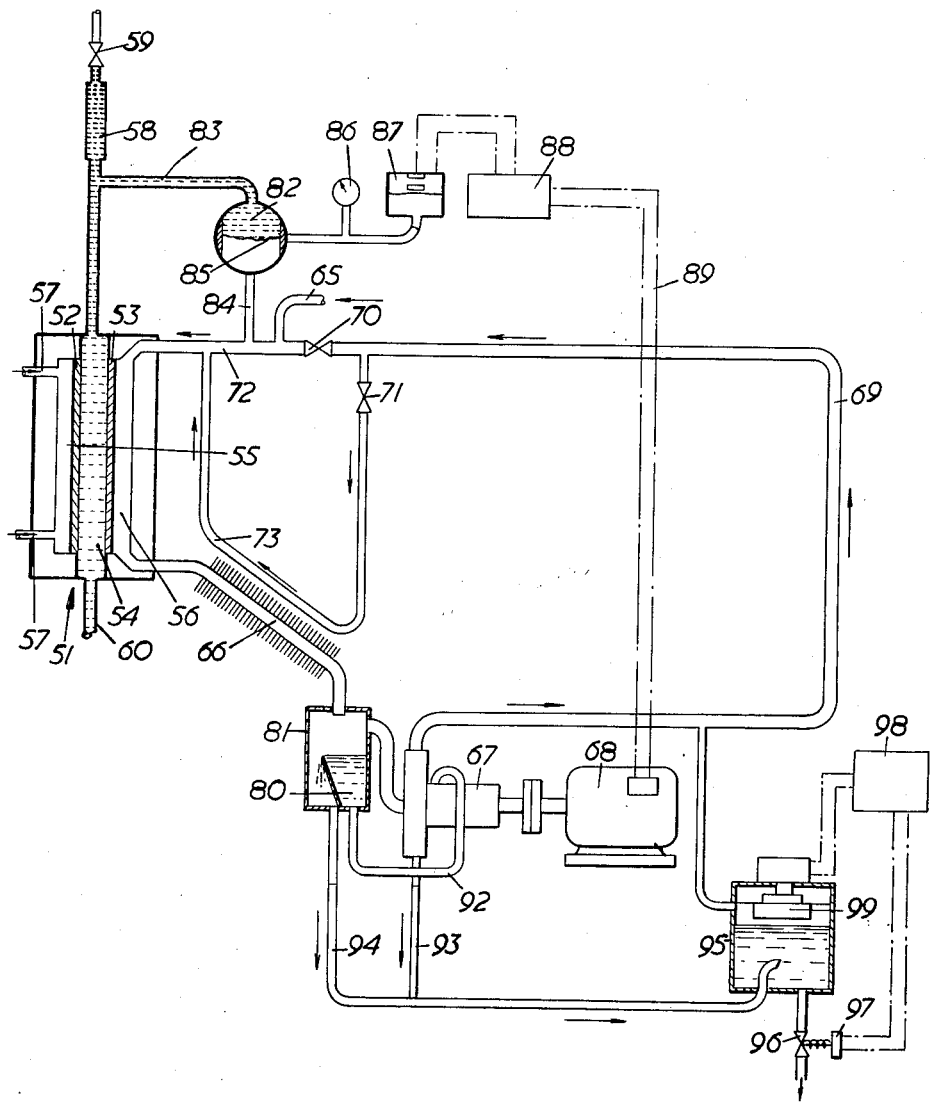

The above and other objects will appear more fully from the following description taken in conjunction with the accompanying drawings, in which:

FIGURE 1 is a general view of one form of apparatus;
FIGURE 2 is a sectional view on the line II—II in FIGURE 1; and
FIGURE 3 is a general view of an alternative form of apparatus.

A battery of fuel cells is shown diagrammatically as 1 and may comprise cells in accordance with my U.S. Patent No. 2,716,670. The battery comprises two halves separated by a central distributor plate 2 seen in section in FIGURE 2. Hydrogen is supplied to the battery by way of a pipe 3 leading from a source of hydrogen (not shown). The pipe 3 communicates with an axial port 4 by means of which the hydrogen is distributed to the individual cells. A branch pipe 5 is provided so as to form a closed circuit through which the hydrogen is circulated by means of a small pump 6 driven by an electric motor 7. The connection between the two is by way of a magnetic coupling (not shown in the drawings).

Oxygen is supplied to the battery by way of a pipe 10 leading from a source of oxygen (not shown) to an axial port 11 leading to the individual cells. Electrolyte is supplied to the battery at the beginning of operation and removed from the battery when required by means of pipes 12 and 13 respectively which may also include a connection to a pressure gauge if required. From these pipes further pipes 14 and 15 lead to axial ports 16 and 17 respectively which in their turn lead to the individual cells. The circuit for the electrolyte also includes a pipe 18 leading to a control valve shown generally as 19.

Turning now to the circulation system for the hydrogen the latter emerges at the bottom of the battery by way of a pipe 25, leading from an axial port 28. The pipe 25 constitutes the inlet pipe to a condenser in the form of a small pot 26. The outlet from the pot is a pipe 27 leading to the pump 6 which completes the circuit by way of the pipe 5.

The battery is designed to work at relatively high temperatures for example of the order of 200° C. and the circulating hydrogen carries with it steam which is condensed in the pot 26. The pipes 25 and 27 extend downwardly within the pot 26 and have tapered ends to prevent the formation of drops. As the level of condensate in the pot 26 rises so the ends of the pipes 25 and 27 are obstructed and since only a relatively small pressure increase is obtained from the pump 6 the circulation of hydrogen stops.

The stoppage of the hydrogen circulation when the battery is on load allows water to accummulate in each cell and causes the differential pressure between the electrolyte and the hydrogen to drop. This effect is used for the control of the valve 19. As already described the electrolyte pressure is fed to the valve by way of a pipe 18 so as to act on the upper side of a diaphragm 30. The lower side of the diaphragm is acted on by the hydrogen pressure connected by way of a pipe 31 leading off the pipe 27 just above the pot 26. As a consequence the differential pressure acts upwardly on the diaphragm 30 where it is balanced by a light spring 32, the compression of which is adjusted by means of a screw 33 passing downwardly through a gland 34. The diaphragm 30 carries a stem 40 provided at its lower end with a valve member 41 co-operating with a seating 42. As the differential pressure drops with the stoppage of condensation the spring 32 opens the valve and allows condensate to escape from the pot 26 by way of a pipe 43 leading to the space below the diaphragm 30. The condensate flows away to atmosphere through a pipe 44 which includes a steam pipe trap shown diagrammatically as 45. This avoids the relatively small valve 19 having to operate against the effects of a large pressure.

In operation steam is carried around by the circulating hydrogen and is condensed in the pot 26 at a rate which is adjusted so that there is no increase in the volume of electrolyte even on maximum load. In general therefore the volume of electrolyte will decrease slightly under these conditions. As soon as the circulation of hydrogen is stopped by the rising level of condensate, however, the electrolyte starts to increase in volume and the differential pressure drops. Depending on the setting of the screw 33 the valve 19 will open when the differential pressure has dropped by a predetermined amount, the condensate will be released and the cycle will restart.

An important operational requirement of a battery of this kind is that the operating temperature should be maintained, thus requiring cooling during normal running. As so far described the amount of condensate released is automatically adjusted to be equal to the quantity of water formed in the battery. It is, however, possible to condense the steam at a greater rate than water is formed in the battery. If this is done a proportion of the condensate may be released by means of the valve 15 while the remainder is returned to the vicinity of the oxygen electrodes by means of further pipes (not shown). Heat is extracted from the system by the condensation of the steam but the total quantity of condensate removed is still equal to the amount of water produced in the battery. The condensate which is returned to the battery is circulated around the exterior of the battery so that it acts as cooling water. The pipes for this purpose are also not shown. This cooling water then re-evaporates to form steam in which form it is returned to the battery in the vicinity of the oxygen electrodes.

In a modification not shown a circulation system is also provided for the oxygen and the reformed steam is introduced to this circulation system. The extraction and return of this portion of the condensate not only assists the cooling but also helps to counteract the concentration polarisation referred to earlier by diluting the electrolyte in the region of the oxygen electrodes. The degree of cooling is controlled by the total amount of steam condensed which, in its turn, depends partly on the rate of circulation of the hydrogen. Thus by controlling the speed of the pump 6 the degree of cooling can be correspondingly adjusted.

In the apparatus of FIGURE 3 one cell of a battery is shown diagrammatically at 51. This comprises oxygen and hydrogen electrodes 52 and 53 separated by an electrolyte space 54. At the rear of each electrode is a gas space 55 and 56 respectively. Oxygen is led to the gas space 55 via pipes 57 and pipes 58 and 60, the former fitted with a valve 59, are connected to the electrolyte space 54, for the supply and removal of electrolyte.

Hydrogen is supplied by way of a pipe 65 and in addition a circulation system for the hydrogen is provided which includes a condenser 66, a pump 67 driven by electric motor 68 and a return pipe 69. Valves 70 and 71 are also included so that if required the hydrogen instead of returning directly to the cell through a pipe 72 may be diverted around a loop 73 so as to be reheated by heat exchange with the warm hydrogen passing through the condenser 66.

While the hydrogen is being circulated it carries away water vapour from the vicinity of the hydrogen electrode 53 and this vapour is condensed in the condenser 66 so as to drip into a trough 80 within a compartment 81. The rate at which water may be extracted from the cell by means of the circulating hydrogen is greater than that at which it is produced in the cell so that to maintain a substantial balance between these two the circulating pump 67 requires to be running for only a proportion of the time. The operation of the pump is, therefore, controlled in accordance with variations in the differential pressure between the electrolyte and the hydrogen. Thus as excessive water starts to collect in the cell the differential pressure drops and the pump is started. This starts to remove water vapour from the cell and thereby to raise the differential pressure once again. When the differential pressure has risen sufficiently, the pump is stopped and the cycle is repeated.

For the purpose of controlling electric motor 68 a differential pressure controller 82 has the electrolyte pressure applied to its upper half by way of a pipe 83 and the hydrogen pressure applied to its lower half by way of a pipe 84. The differential pressure thus acts on a diaphragm 85. The differential pressure is measured by a gauge 86 and controls a pressure switch 87 which in its turn operates a relay 88 connected in the starting circuit 89 of the motor 68. Thus as the differential pressure drops the switch 87 is closed, the relay 88 is operated and the motor 68 starts. When the differential pressure rises again, the reverse occurs and the motor 68 and the pump 67 stop.

Condensate from the trough 80 is caused to flow through a pipe 92 so as to lubricate the bearings of the pump 67. Thereafter it flows through a pipe 93 to join the overflow from the trough passing down a pipe 94. The total volume of condensate then collects in a receiver 95. This is fitted with a release valve 96 operated by a solenoid 97 which is controlled by a controller 98. The controller 98 in its turn responds to a capacitance probe 99 so that as the level of condensate in the receiver 95 rises to a point such as that shown in the drawing, the valve 96 is opened and the condensate is released. The valve 96 then closes again and the receiver 95 is refilled.

I claim:
1. In a hydrogen-oxygen fuel cell having porous electrodes in which differential pressure between the gases and the electrolyte is balanced by capillary attraction in the pores of the electrodes, the cell being provided with a hydrogen circulation system which includes a condenser for the steam carried by the circulating hydrogen, the improvement comprising a valve for controlling the discharge of condensate from said condenser, means for interrupting the circulation of the hydrogen in said hydrogen circulation system when the condensate reaches a predetermined level in said condenser, and control means responsive to the differential pressure between the electrolyte and the hydrogen for operating said valve to discharge the condensate when the differential pressure drops below a predetermined value.

2. A fuel cell according to claim 1, in which the condenser is arranged to interrupt the circulation of hydrogen when the condensate reaches a predetermined level.

3. A fuel cell according to claim 2, in which the hydrogen inlet and outlet pipes to the condenser extend downwardly within the latter so that their ends are covered by the rising level of condensate.

4. A fuel cell according to claim 1, in which the valve includes a diaphragm acted on one side by the hydrogen pressure and on the other side by the electrolyte pressure assisted by an adjustable spring, whereby the value of the differential pressure at which the valve operates may be adjusted.

5. A fuel cell according to claim 1, in which the circulation of hydrogen is produced by means of a pump driven by means of a magnetic coupling acting through a non-magnetic wall.

6. In a hydrogen-oxygen fuel cell having porous electrodes in which differential pressure between the gases and the electrolyte is balanced by capillary attraction in the pores of the electrodes, the cell being provided with a hydrogen circulation system which includes a condenser for the steam carried by the circulating hydrogen, the improvement comprising means for interrupting the circulation of the hydrogen in said hydrogen circulation system when the condensate reaches a predetermined level in said system, and control means responsive to the differential pressure between the electrolyte and the hydrogen affecting the level of condensate in said system.

7. In a hydrogen-oxygen fuel cell having porous electrodes in which differential pressure between the gases and the electrolyte is balanced by capillary attraction in the pores of the electrodes, the cell being provided with a hydrogen circulation system which includes a condenser for the steam carried by the circulating hydrogen, the improvement comprising means for interrupting circulation of the hydrogen in said hydrogen circulation system in response to quantity of condensate collected in the system and control means responsive to the differential pressure between the electrolyte and the hydrogen to restart said hydrogen circulation when said differential pressure drops below a predetermined level.

8. In the process of generating electricity by the combination of oxygen and hydrogen to form water in a fuel cell in which differential pressure between the gases and the electrolyte is balanced by capillary attraction in the pores of the electrodes, fluid comprising hydrogen is circulated in a recycle circuit which includes a section external of said cell and water is removed from said recycled hydrogen to maintain a substantially constant volume of electrolyte, the improvement which comprises controlling the flow of hydrogen containing fluid in the recycle circuit in response to changes in differential pressure between the hydrogen and the electrolyte.

9. In a hydrogen-oxygen fuel cell having porous electrodes in which differential pressure between the gases and the electrolyte is balanced by capillary attraction in the pores of the electrodes, the cell being provided with a hydrogen circulation system which includes a condenser for the steam carried by the circulating hydrogen, the improvement comprising a hydrogen circulating pump connected in said circulation system, means for controlling said pump in response to the differential pressure between the electrolyte and the hydrogen, a receiver for condensate from said condenser and means for releasing condensate from said receiver.

10. In a hydrogen-oxygen fuel cell having porous electrodes in which differential pressure between the gases and the electrolyte is balanced by capillary attraction in the pores of the electrodes, the cell being provided with a hydrogen circulation system which includes a condenser for the steam carried by the circulating hydrogen, the improvement comprising a hydrogen circulating pump connected in said circulating system, an electric motor connected to drive said pump, means for starting and stopping said motor in response to variations in the differential pressure between the electrolyte and the hydrogen, a receiver for condensate from said condenser and means for releasing said condensate from said receiver.

11. A hydrogen-oxygen fuel cell as claimed in claim 10 in which said means for releasing condensate is a capacitance probe.

12. In a hydrogen-oxygen fuel cell having porous electrodes in which differential pressure between the gases and the electrolyte is balanced by capillary attraction in the pores of the electrodes, the cell being provided with a hydrogen circulation system which includes a condenser for the steam carried by the circulating hydrogen, the improvement comprising a differential pressure gauge responsive to variations in the differential pressure between the electrolyte and the hydrogen, a switch closed by said gauge in response to a fall of said differential pressure below a datum value, a relay operated by closing of said switch, an electric motor controlled by said relay, a hydrogen pump driven by said motor, said pump being connected in said hydrogen circulation system, a receiver for condensate from said condenser, a valve for releasing condensate from said receiver and a capacitance probe responsive to the depth of condensate in said receiver for opening said valve.

No references cited.